United States Patent Office 3,553,966
Patented Jan. 12, 1971

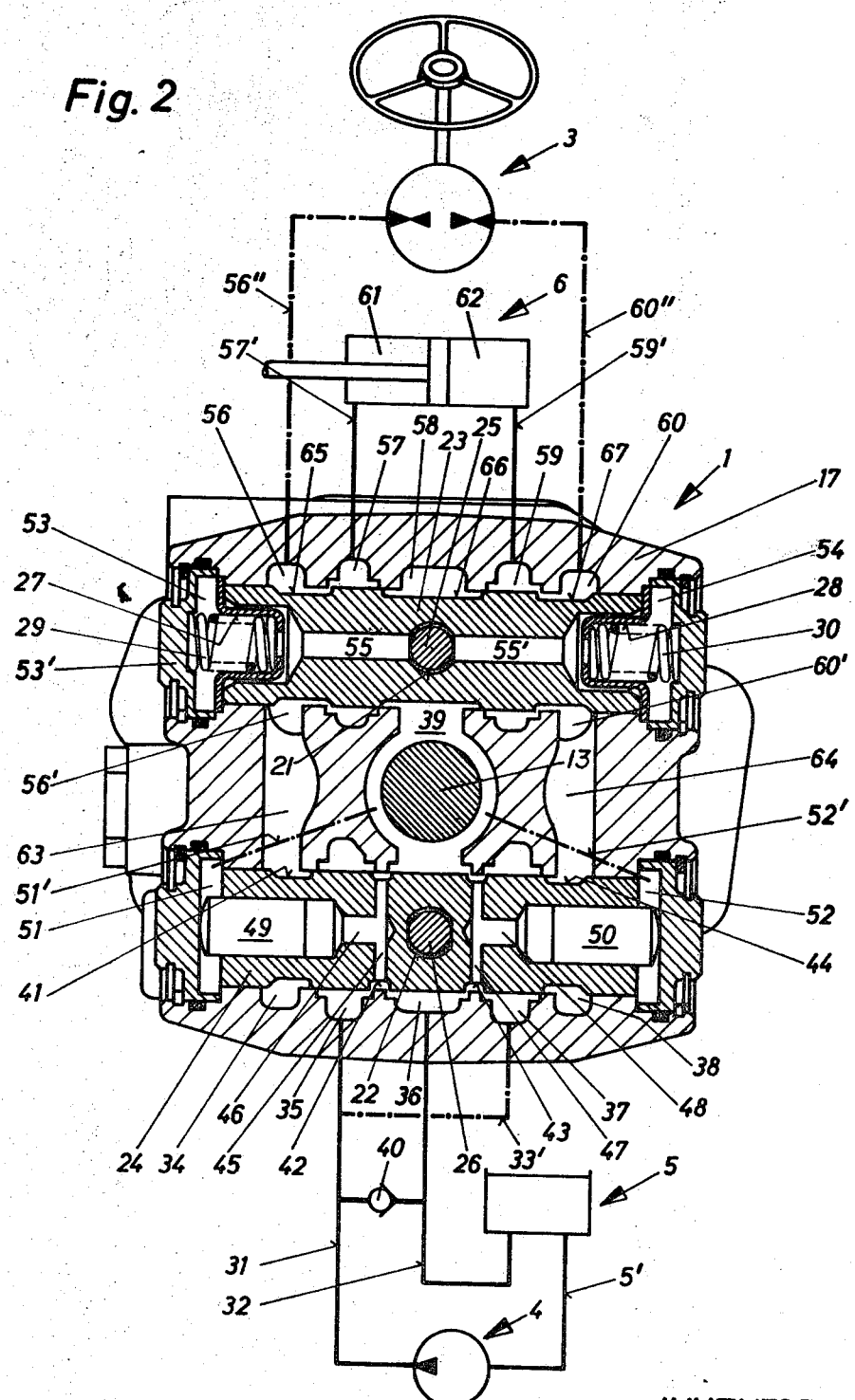

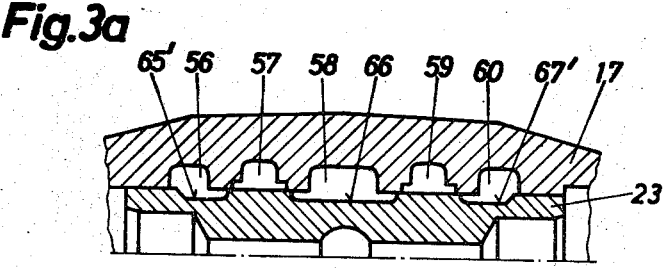
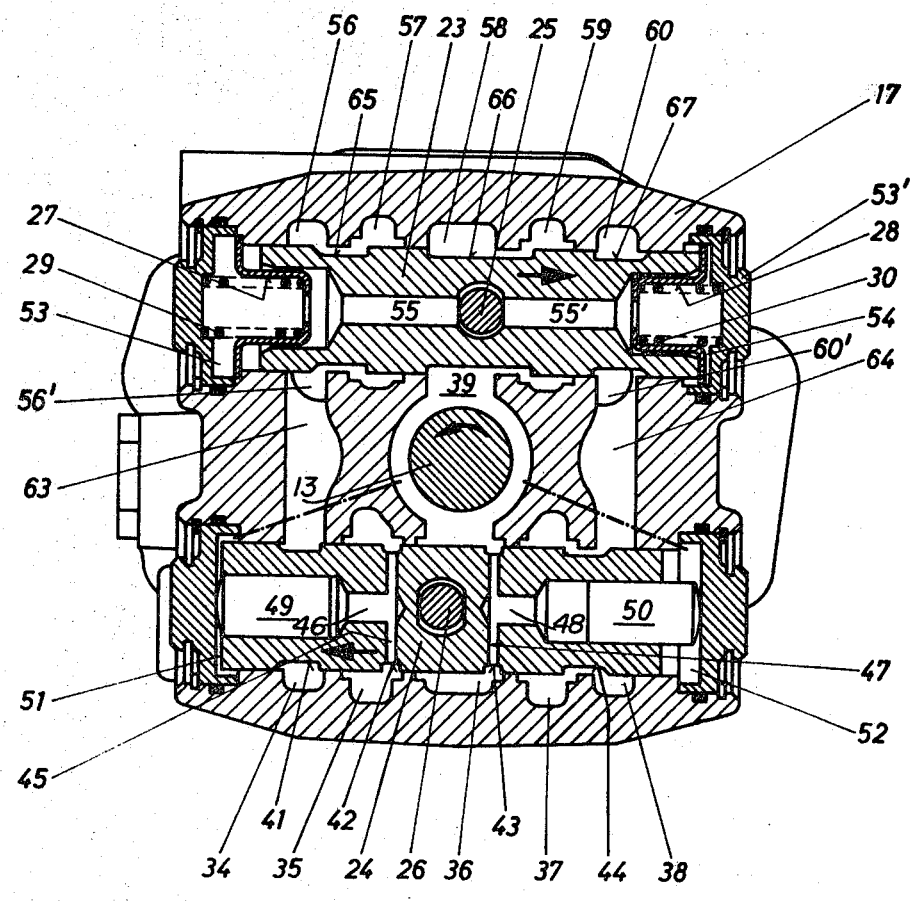

---

3,553,966
BOOSTER STEERING CONTROL DEVICE
Karl-Heinz Liebert, Schwabisch Gmund, Germany, assignor to Zahnradfabrik Friedrichshafen Aktiengesellschaft, Friedrichshafen, Germany, a corporation of Germany
Filed May 14, 1969, Ser. No. 824,657
Claims priority, application Germany, June 22, 1968,
1,755,792
Int. Cl. F15b *15/18;* B62d *5/00*
U.S. Cl. 60—52                                                14 Claims

ABSTRACT OF THE DISCLOSURE

The invention comprises a valve array for hydraulic servomotor booster steering systems of the type which uses a control or a metering pump to control flow from a main pump wherein the main pump flow passes through the metering pump. In the present construction pressure flow to a double ended hydraulic cylinder, and an exhaust therefrom is controlled by a pair of coacting reciprocal piston valves which are shifted by the manual torque of rotating a vehicle steering wheel. Such shifting of the piston valves is effective within predetermined limits of movement and means are provided in conjunction with one of the piston valves for effecting road reaction, that is, a simulated steering resistance to rotation of the steering wheel which is proportional to the working pressure in the servomotor.

---

Prior art arrangements which utilize metering pumps shift control valves responsive to pressure of the metering pump. It has been found that this arrangement introduces losses due to flow pressure within the pump and within the connections from the pump. Such losses must be overcome by manual force at the steering wheel. In addition, manual force that must be provided to enable the metering pump to build up sufficient pressure for shifting control valves against the usual spring bias. Inasmuch as the force necessary for shifting such control valves increases with the discharge rate of the metering pump, the output of such pump must be kept limited within the bounds of force that can be physically exerted by a vehicle driver.

Some prior art arrangements utilize manual force actuation of reciprocal valves via steering wheel rotation but these arrangements do not provide a simulated road feel reaction which is proportional to the operating pressure in the servomotor.

In prior art constructions using a rotary control valve the quantity of pressure flow which can be handled is limited by the inherent construction and it is not possible to provide a simulated steering resistance proportional to servomotor pressure.

The present invention overcomes the drawbacks of the prior art by utilizing reciprocal valves in an arrangement provided to achieve road feel proportional to the net working pressure. Thus, a gear means is provided to drive the metering pump wherein the orbit gear of a planetary arrangement shifts a pair of reciprocal piston valves having a limited movement but rotation of the metering pump can continue after such shifting. By providing one such piston valve with independently movable plugs or small pistons communicating with servomotor flow passages, it is possible to effect an unbalance of pressure on that piston valve, viz., a force in the direction opposite to the direction it is being shifted by the manual force exerted on the steering wheel.

The net result is that a simulated steering resistance proportional to the servomotor working pressure can be achieved.

A further advantage of the invention is that the servomotor power is independent of the manual force exerted on the control pump due to the fact that the piston valves which control pressure flow are mechanically operated. Further, the invention inherently permits control with relative ease of a larger pressure flow than is possible with prior art devices.

A detailed description of the invention now follows in conjunction with the appended drawing in which:

FIG. 2 is a cross section on the line II—II of FIG. 1 showing the positions of the piston valves for neutral steering condition when the vehicle is proceeding straight ahead, and also showing symbolically the hydraulic circuitry for the components of the overall system;

FIG. 3 is a view similar to FIG. 2 but showing the positions of the piston valves after they have been actuated for a right hand turn;

FIG. 3a is a detail of a valve piston modified so as to have narrow grooves;

Figure 1:
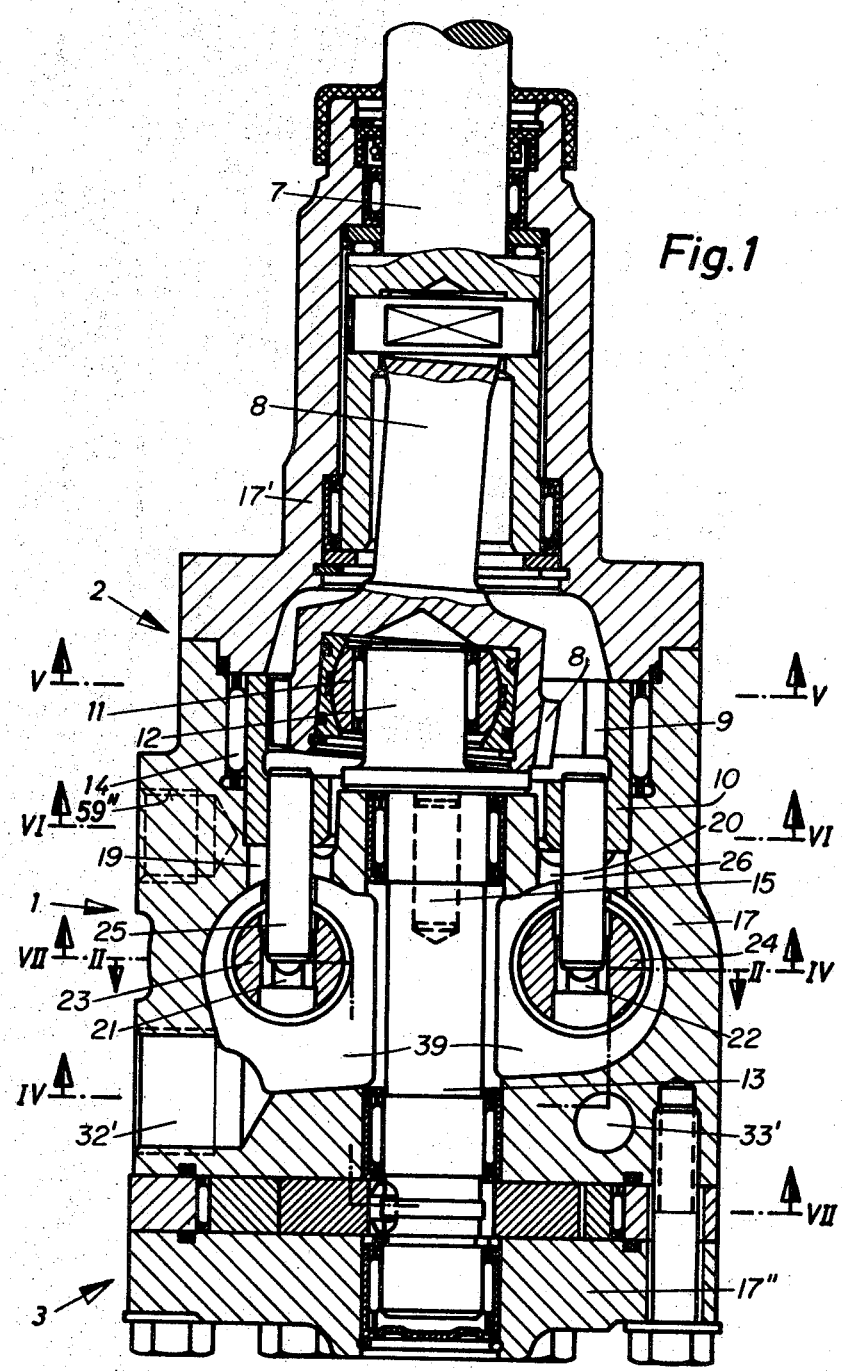
FIG. 1 is a longitudinal cross section of the invention showing the gearing for actuating the piston valves and the crank shaft connection from the steering spindle to the metering pump.
Figure 7:
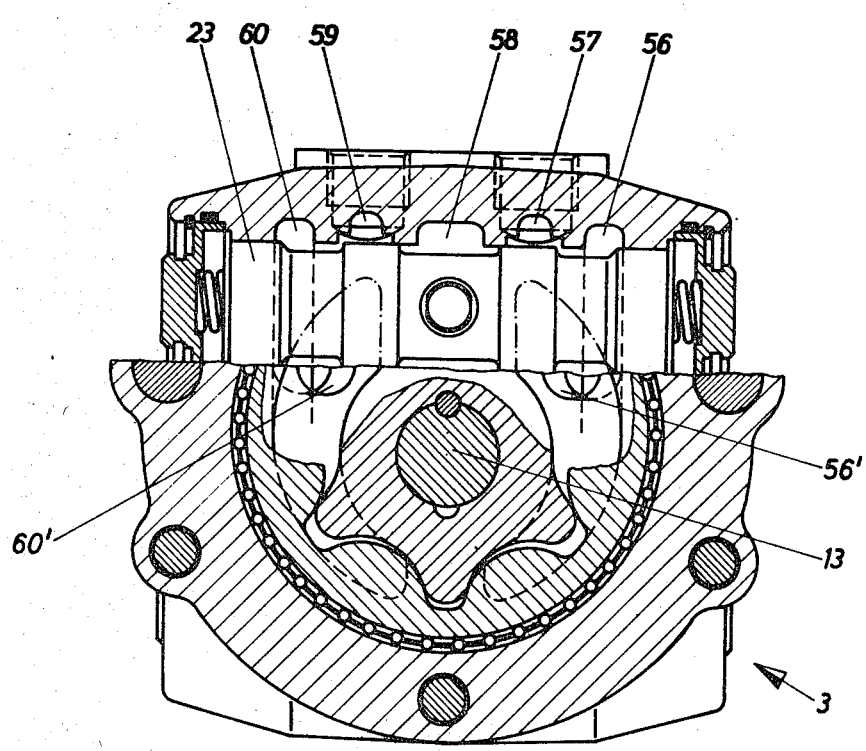
FIG. 7 is a cross section of the line VII—VII of FIG. 1.

Referring to FIGS. 1 and 2, a valving array 1 is shown comprising a housing 17 with bores 19 and 20 for piston valves 23 and 24, respectively. The upper portion of the housing is closed by a steering spindle support collar 17' and the bottom of the housing comprises a control or metering pump 3 of the usual gear type as illustrated in FIG. 7 and enclosed by bottom plate 17'' bolted as shown.

A steering spindle 7 protrudes into the collar 17' for driving a planetary gear system 2 and has a hollow enlarged end portion rockably pinned to the extending shaft of a pinion gear 8 so that the pinion can nutate around the spindle axis as it is rotated by the spindle to engage its teeth 8' with the teeth 9 of an internal gear 10 which is coaxial with the spindle and supported in a bearing 14. Gear 10 is reversibly rotative within limits as will be explained.

Figure 6:
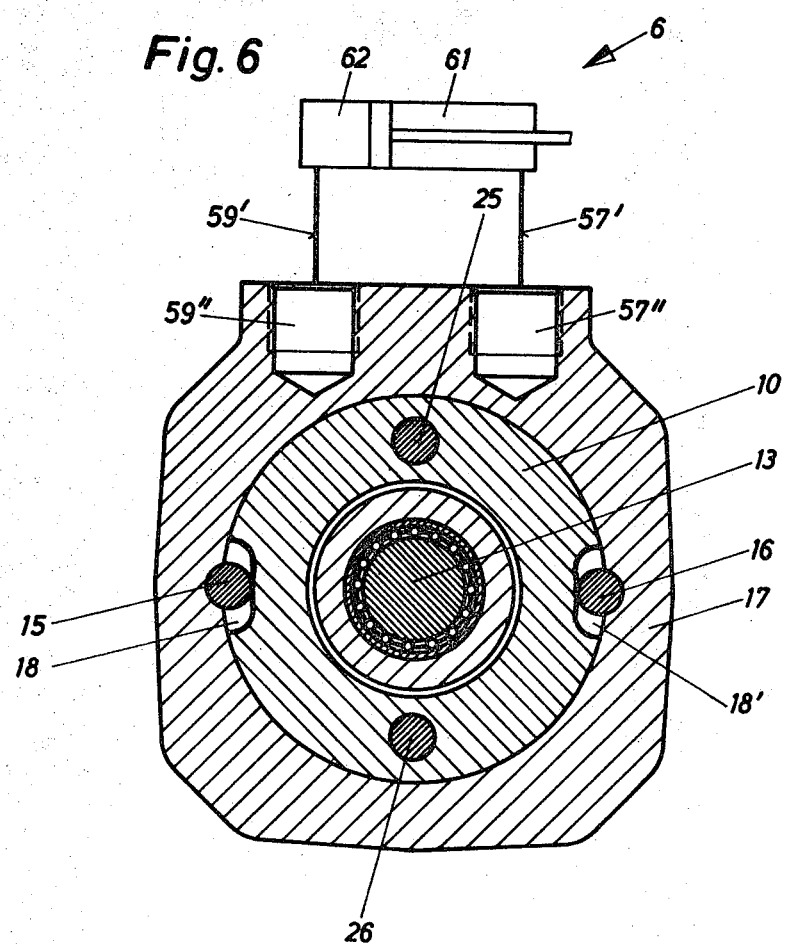
FIG. 6 is a cross section on the line VI—VI of FIG. 1, showing the neutral position of part of the gearing means.

As shown in FIG. 6, gear 10 has side slots 18 and 18' engageable in either direction of rotation of the gear with a fixed pin 15 or 16, respectively, to limit gear rotation to the arcuate width of the slots. The pins are carried by housing 17; shown narrower than the slots.

The piston valves can be reversely shifted within the limits provided by the limited rotation of gear 10, for left and right turns, being movable in opposite directions by driving force transmitted via actuating pins 25 and 26 carried by gear 10 and extending through housing bores 19 and 20, respectively, to engage in respective bores 21 and 22 of the valve pistons.

The hollow hub of pinion 8 has a universal bearing 11 accommodating the crank end 12 of pump shaft 13 which rotates the metering pump 3 (FIGS. 1 and 7) for operation of the device.

Referring to FIGS. 1, 2, 5 and 6, it will be noted that the steering spindle 7 will cause a nutating movement of the pinion gear shaft in the same direction as the rotation of the spindle, the gear 10 will likewise rotate in the direction of the steering spindle. However, the crank 12 and pump shaft 13 will rotate in the opposite direction at an increased speed depending upon the ratio of teeth between the pinion 8 and the gear 10. Thus a small movement of the steering spindle produces a proportionally larger rotation of the metering pump which is keyed to be driven by shaft 13.

Reference is made to a co-pending U.S. application of Liebert, S.N. 751,769, filed Aug. 12, 1968, now Pat. No. 3,500,756, issued Mar. 17, 1970 owned by the present assignee, showing a similar gearing for a metering pump actuation.

Referring to FIGS. 2 and 3, the housing bore for valve piston 23 has grooves 56, 57, 58, 59 and 60 for sliding coaction with grooves 65, 66 and 67 of valve piston 23, while the housing bore for piston valve 24 has grooves 34, 35, 36, 37 and 38 for sliding coaction with grooves 41, 42, 43 and 44 of valve piston 24.

It will be appreciated that shifting of the piston valves effects respective groove coaction to permit, cut off, or throttle, flow for steering control, as hereinafter described.

Piston valve 23 is maintained in center or neutral position for straight ahead steering by springs 29 and 30 socketed in cups 27 and 28, respectively, secured in the housing chambers 53 and 54, respectively. The piston valve has axial aligned bores 55 and 55' communicating with such chambers for pressure balance and the chambers are effected by removable end caps such as 53'' sealed into the housing as shown.

Piston valve 24 has a pair of slidable reaction pistons 49 and 50 having outer ends exposed in respective chambers 51 and 52 provided by removable end caps similar to end cap 53', as shown. The inner ends of pistons 49 and 50 communicate with axial bores 46 and 48, respectively, in piston valve 24, and radial bores 45 and 47, respectively.

A fairly large chamber 39 in housing 17 surrounds the pump shaft which chamber communicates with chambers 51 and 52 via channels 51' and 52' shown symbolically in FIG. 2. Chamber 39 also communicates with chambers 53 and 54 via the respective bores 55 and 55' and the openings 21 and 22, respectively, as will be noted upon comparison of FIGS. 1 and 2.

Figure 4:
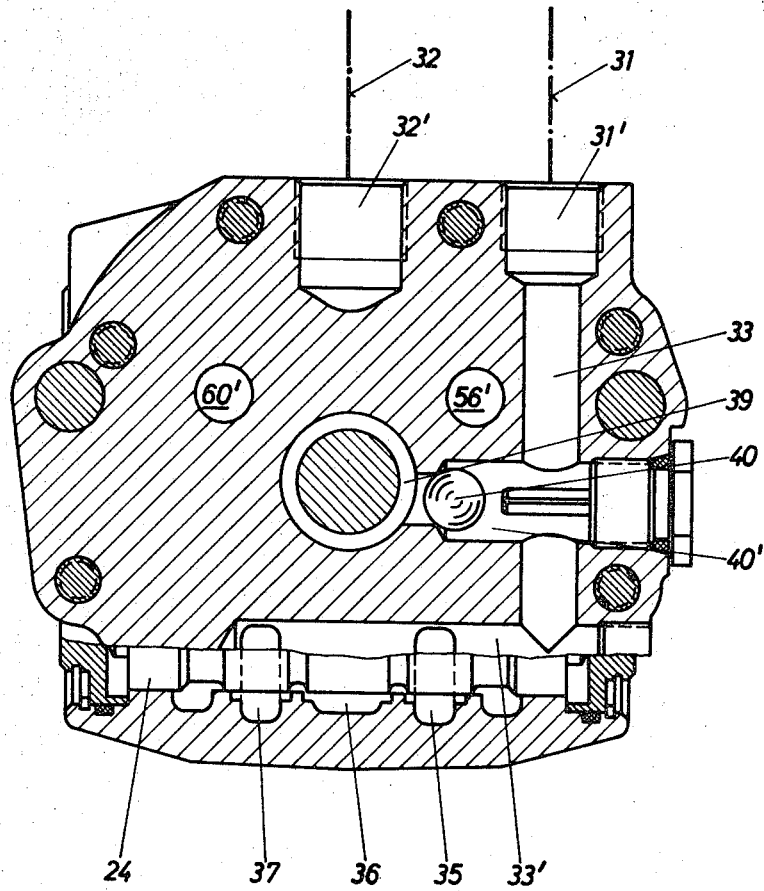
FIG. 4 is a cross section on the line IV—IV of FIG. 1.
Figure 5:
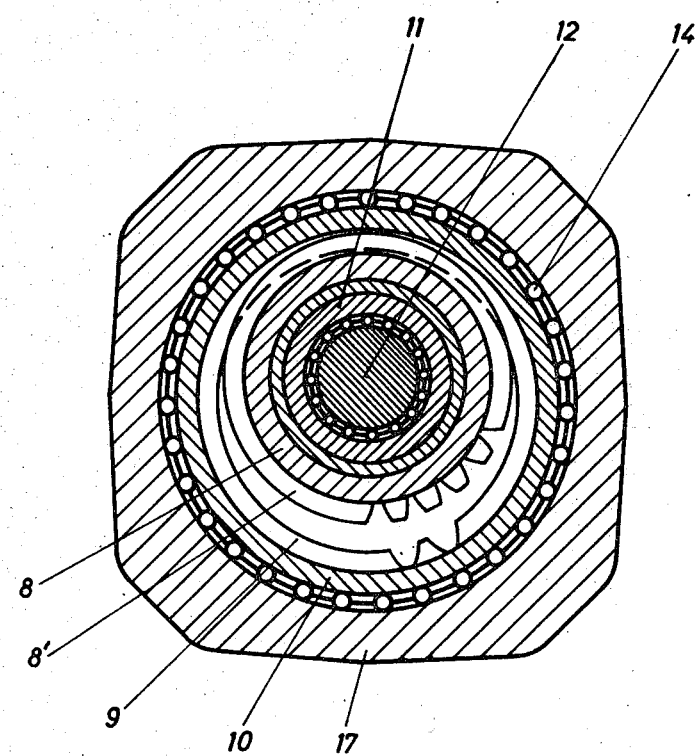
FIG. 5 is a cross section on the line V—V of FIG. 1.

Referring to FIGS. 2, 4 and 7 passages 56' and 60' connect grooves 56 and 60 respectively, with metering pump 3, shown symbolically in FIG. 2 by lines 56'' and 60''. Passages 56' and 60' also connect to respective cross passages 63 and 64 for flow communication to and between grooves of the piston valves 23 and 24 during operation.

As noted in FIG. 2, a conduit 31 connects the outlet of main pump 4 to grooves 35 and 37 via a channel 33' shown in FIG. 4. This channel connects with a cross bore 33 having threaded inlet port 31', also shown in FIG. 4. A conduit (FIG. 2) 32 leads from groove 36, connecting at threaded port 32' (FIG. 4), and extending to tank 5 (FIG. 2). This conduit is for exhaust fluid from chamber 39 which communicates with groove 36. As shown in FIG. 4 (also shown in phantom in FIG. 2) there is a normally closed ball check valve 40 in a passage 40'. Such valve is maintained closed by main pump pressure in bore 33'; but passage 40', except for closure by the valve 40 communicates with return chamber 39. This is the equivalent of the phantom showing in FIG. 2 wherein valve 40 is, if opened, a bypass between outlet pump flow and return flow to the tank. As later explained, valve 40 can open to permit flow from metering pump 3 for servomotor operation in the event of breakdown of main pump 4.

The inlet of main pump 4 connects to tank 5 via conduit 5'.

Grooves 57 and 59 connect at threaded ports 57'' and 59'' via conduits 57' and 59' to chambers 61 and 62, respectively, of servomotor 6.

The neutral position of the piston valves 23 and 24 for straight ahead steering is shown in FIG. 2, the output of pump 4 feeding the grooves 35 and 37 with pressure fluid which, however, is under little or no pressure since it is routed to tank 5. Thus, from grooves 35 and 37 there is a return of flow via grooves 42 and 43, and groove 36 through the return conduit 32 to tank 5.

It will be appreciated that the groove 36 communicates with the chamber 39; however, the chamber 39 serves primarily as a central or manifold return chamber in communication with groove 36 for exhausting flow to tank 5 in the course of operating the device for steering.

At this time, in neutral position, pressure flow is blocked at grooves 35 and 37 from the respective passages 63 and 64 by the position of valve 24 and is also blocked from grooves 57 and 59 by the position of valve 23. Thus, no flow can reach the servomotor. However, due to the width of grooves 65 and 67 there is communication between the ends of the servomotor via conduits 57' and 59' to grooves 57 and 59 which communicate with respective sides of pump 3 and passages 56' and 60', respectively. Accordingly both chambers of servomotor 6 are connected to the control pump 3 which results in road shock being transmitted through pump shaft 13 which tends to cause shifting of piston valves 23 and 24. This counteracts by virtue of pressure from main pump 4 against shock reaching the metering pump 3 of that side of the pump opposite to that side which receives the thrust. On the other hand, the force of springs 29 and 30 and the road reaction feel effect produced by pistons 49 and 50 are experienced at the steering wheel as road reaction force.

Although the above effect of the invention may be advantageous in some installations, it might be desirable to isolate the control pump 3 from the servomotor 6 so that the servomotor will be hydraulically blocked against movement due to the vehicle wheels encountering road impediments. This is easily achieved as shown in FIG. 3a with the simple change of using narrowed grooves 65' and 67' so that groove 56 will be isolated from groove 57 and groove 59 will be isolated from groove 60. Thus, the pairs of grooves which communicate with the metering pump 3 and the servomotor are isolated completely from each other by the narrowed grooves in the reciprocal piston valve 23 when that valve is in neutral position for straight ahead steering.

In operation, assuming a right hand turn, the steering wheel (FIG. 2) is rotated to cause rotation of spindle 7 in the direction for right hand turn and through the pinion shaft and pinion 8 rotation of gear 10 will take place following the direction of rotation of the steering spindle. Such rotation is limited by the limit pins 15 and 16 and slots 18 and 18' (FIG. 6). The actuating pin 25 (FIG. 3) will cause piston valve 23 to move to the right, as shown by the arrow, against the bias of spring 30, while actuating pin 26 will shift piston valve 24 to the left. The shifting of piston valve 24 throttles the idling of fluid from pump 4 through flow grooves 35 and 37 to groove 36 as will be noted by comparing FIG. 2 with FIG. 3. This shuts off flow to the return chamber 39, but flow now takes place under pressure build up from pump 4 to groove 37 and thence to groove 44 and groove 38 to channel 64, and via passage 60' around groove 60 to conduit 60' to the inlet side of the metering pump 3. Thereafter, flow receives a slight increase in pressure due to rotation of the metering pump via the crank 12 and pump shaft 13 and such flow from the metering pump is metered out of the outlet of that pump and at a rate commensurate with the rate of turning of the steering wheel. The flow from the metering pump passes via passage 56' to groove 56 and groove 65 whence it flows to groove 57 and conduit 57' to the chamber 61 of the servomotor 6. Accordingly, the piston will move to the right as seen in FIG. 2.

Exhaust from chamber 62 flows via a conduit 59', groove 59, groove 66 to groove 58 and thence to the return chamber 39 where it communicates via threaded port 32' (FIG. 1) and conduit 32 with tank 5 back to the inlet of main pump 4.

Referring to FIG. 3, in the course of the above described operation, the pressure flow in groove 35 goes to groove 42, radial bore 45, and axial bore 46 to exert a force on the piston 49. This is the working pressure in cylinder chamber 61. However, there is only exhaust pressure acting on the piston 50 via chamber 39, groove 36.

and bores 43 and 47. As a result, there is an unbalance of pressure acting on piston valve 24, toward the right, which is against the direction of the arrow shown in FIG. 3, such arrow representing the direction of manual force produced by the steering spindle rotation. Accordingly, this reverse force serves to simulate "road feel" and is obviously proportional to the net pressure acting to motivate the hydraulic piston since the servomotor pressure is fed via groove 35.

In the event of a left hand turn, the operation as described above is simply reversed, flow then going through the metering pump in the opposite direction and the piston valves being moved manually in the direction opposite the arrows shown in FIG. 3. In such case, it will be apparent from the symmetry of the grooves in the housing and in the piston valves that pressure flow will be in reverse directions so that cylinder chamber 62 will be pressurized and chamber 61 will be exhausted. At the same time the road reaction feel will be caused by a pressure unbalance on piston valve 24 due to working pressure acting against piston 50 with exhaust pressure acting against piston 50 with exhaust pressure acting against piston 49. Although pistons such as 49 and 50 are movable, they could be fixed plug members secured to the end caps such as 53'.

In the event of breakdown of pump 4, manual operation via the steering wheel can actuate the metering pump to provide usable booster power. In such case, assuming a right hand turn, the piston valves 23 and 24 take the positions shown in FIG. 3 and intake suction of pump 3 effects opening of ball check valve 40. Flow can then take place from tank 5 via conduit 32 (FIG. 2) ball check valve 40, cross bore 33, channel 33', to groove 37, via groove 44, groove 38, channel 64, passage 60', to the inlet side of the pump 3. The outlet side of pump 3 sends pressure flow to cylinder chamber 61 in the manner previously described for operation, and chamber 62 exhausts in the manner described.

I claim:
1. A valve device comprising housing means having a pair of reciprocal valves therein;
said housing means and valves having coacting grooves for controlling flow responsive to shifted positions of said valves;
a steering spindle and gearing means rotative by said spindle for actuating a metering pump;
said gearing means comprising valve drive means coupled to said valves for manual force reciprocation thereof upon rotation of said steering spindle; and
motion limiting means for limiting the extent of reciprocation of said piston valves while permitting continued rotation of said spindle to actuate said metering pump.

2. A valve device as set forth in claim 1 wherein said last named means comprises a rotative gear in said gearing means and having slot means; and fixed pin means extending into said slot means operative to limit rotation of said gear.

3. A valve device as set forth in claim 1, said housing means comprising a housing supporting said gearing means and said gearing means comprising an orbit gear.

4. A valve device as set forth in claim 1, and steering resistance simulating means comprising a pair of plug members;
one reciprocal valve having relative movement with respect to said plug members;
means comprising bores in said one valve for conducting high or low pressure flow to corresponding opposed ends of said plug members responsive to shift of said one valve in a specific direction;
said plug members having opposite ends supported by said housing means against pressure exerted on said first mentioned ends;
whereby a difference in pressure on said plug ends effects an unbalanced force on said one valve resisting effort to effect shifting thereof.

5. A valve device as set forth in claim 1, and steering resistance simulating means comprising a pair of plug members;
one said reciprocal valve having relative movement with respect thereto;
said housing means having passages for conducting high and low pressure flow to the grooves of said housing from the chambers of a double end servomotor;
said plug member being disposed in aligned bores of said one valve connected with the passages thereof wherein said bores are isolated from each other and said passages conduct flow to respective bores;
said plug members having ends exposed to pressure in respective bores and have opposite ends supported by said housing means against pressure exerted on said first mentioned ends;
wherein said passages conduct via said bores high and low pressure flow to said first mentioned ends of said plug members depending on the direction of shift of said one valve;
whereby a difference in pressure exerted on said plug members effects an unbalanced force on said one valve resisting effort to effect shifting thereof which is proportional to the net working pressure of said servomotor.

6. A valve device as set forth in claim 1, said housing means having passages for connecting pressure flow at high working pressure to a servomotor responsive to a shifted position of one of said reciprocal valves;
and means coacting with said one valve to effect an unbalanced pressure force thereon proportional to said high working pressure.

7. A valve device as set forth in claim 4, including, in combination, a servomotor;
said housing means having passages for connecting flow of high and low pressure to said one valve to and from said servomotor;
said housing means passages connecting to said passages of said one valve when shifted so that the unbalanced force thereon is proportional to the net working pressure in said servomotor.

8. A valve device as set forth in claim 1, a centering spring means operative to hold one of said reciprocal valves in a neutral position.

9. A valve device as set forth in claim 1, including in combination, a double ended servomotor and a metering pump;
wherein a pair of the housing means grooves are disposed on respective opposite sides of another pair of grooves in said housing means;
said first pair of housing means grooves being connected to said metering pump and said second pair of housing means grooves being connected to the chambers of said servomotor.

10. A valve device as set forth in claim 1, said valve drive means comprising a gear in said gearing means;
said gear having drive pins coupled to respective valves for reciprocation thereof;
said motion limiting means comprising a slot in said gear and a pin carried by said housing means having lost motion engagement with edges of said slot to limit rotative motion of said gear.

11. A valve device as set forth in claim 9, and means (65, 67) whereby one groove of each pair are in constant flow communication with each other when said valve device is in neutral position for straight ahead steering.

12. A valve device as set forth in claim 11, said means comprising grooves in one of said reciprocal valves effecting a connection for said flow communication.

13. A valve device as set forth in claim 9, and means (65', 67') whereby said pairs of grooves are isolated from each other to block flow communication therebetween when said valve device is in neutral position for straight ahead steering.

14. A valve device as set forth in claim 13, said latter means comprising grooves in one of said reciprocal valves operative upon shifting said reciprocal valve to effect flow communication between one groove of each said pair of grooves but isolating one groove of each said pair in said neutral position.

References Cited
UNITED STATES PATENTS

| | | | |
|---|---|---|---|
| 2,020,951 | 11/1935 | Lemon | 60—52S |
| 3,180,233 | 4/1965 | Jablonsky | 180—79.2X |
| 3,358,711 | 12/1967 | Provot | 60—52SX |
| 3,438,200 | 4/1969 | Jennings et al. | 60—52SX |
| 3,446,021 | 5/1969 | Lech | 60—52SX |

EDGAR W. GEOGHEGAN, Primary Examiner

U.S. Cl. X.R.

91—374; 180—79.2